April 19, 1932.   J. W. LEIGHTON   1,854,411
METHOD OF MAKING TUBULAR METAL BLANKS
Filed March 16, 1931   2 Sheets-Sheet 1
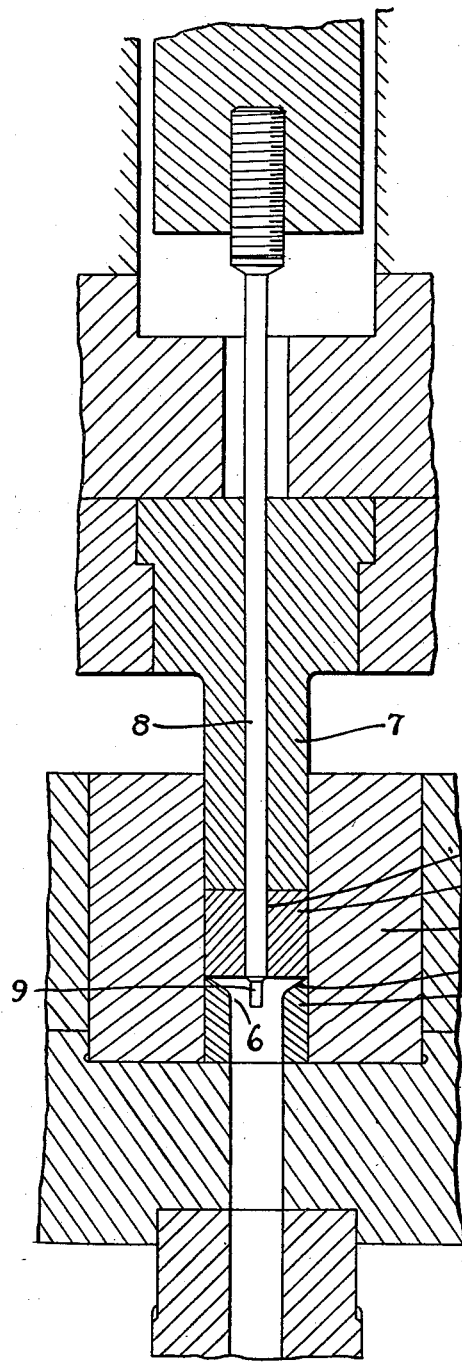
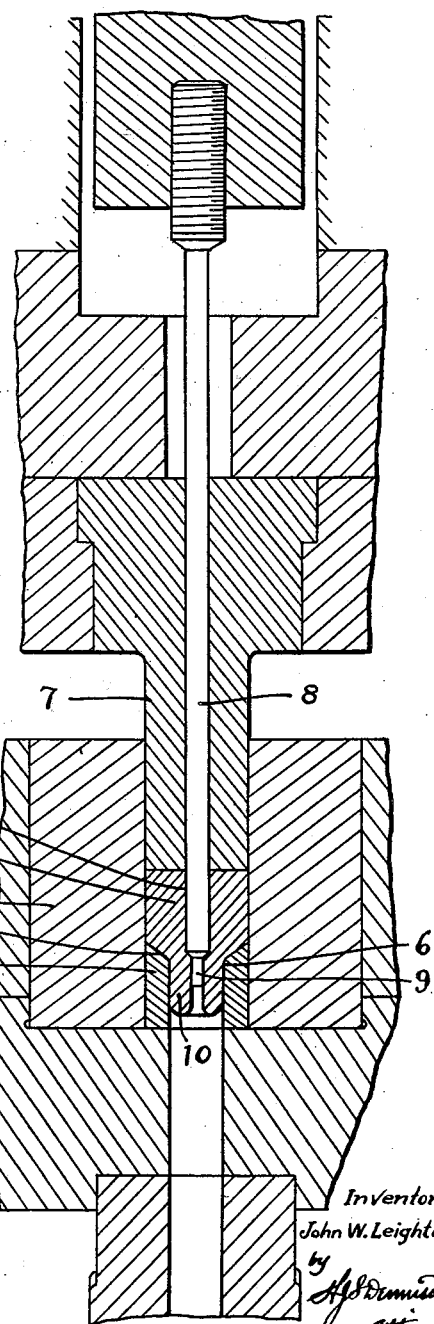
Inventor
John W. Leighton Inventor
John W. Leighton Patented Apr. 19, 1932

1,854,411

UNITED STATES PATENT OFFICE

JOHN WYCLIFFE LEIGHTON, OF PORT HURON, MICHIGAN

METHOD OF MAKING TUBULAR METAL BLANKS

Application filed March 16, 1931. Serial No. 522,929.

The principal object of this invention is to form blanks, particularly adaptable for tire valve bodies by a method of extrusion, thereby reducing the machine operations for completing the body and effecting a remarkable saving of labor and material.

A further and important object is to devise a method whereby such articles as tire valve bodies may be formed from bulk metal rather than from pre-manufactured rod.

The principal feature of the invention consists in the novel method of forming a tubular blank with a stem of a diameter smaller than the base and of a desired cross sectional shape.

In the accompanying drawings, Figure 1 is a longitudinal sectional view through the die and punches used to carry this invention into effect showing the billet in the die with the punches in position ready to commence the extrusion of the metal of said billet.

Figure 2 is a view similar to Figure 1 showing the extrusion punch slightly advanced and the metal of the billet partly extruded through the throat of the die.

Figure 3:
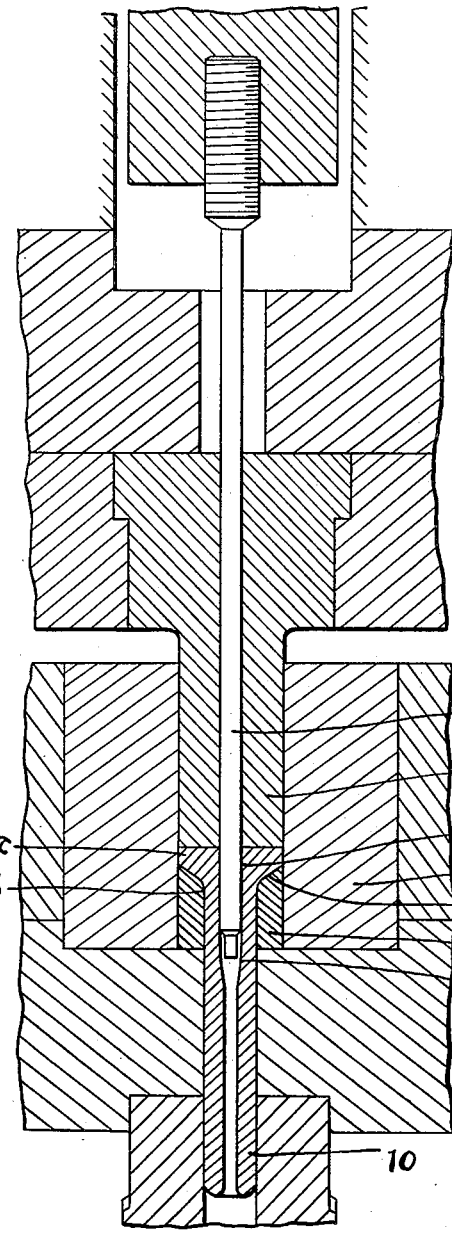
Figure 3 is a view similar to Figures 1 and 2 showing the main punch advanced to substantially its maximum position with the pilot punch shown in its altered relation in respect to the throat of the die to create a difference in diameter in the interior of the extruded member.
Figure 5:
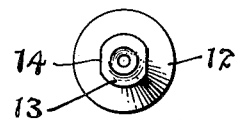
Figure 5 is an end elevational view of the completed blank.
Figure 4:
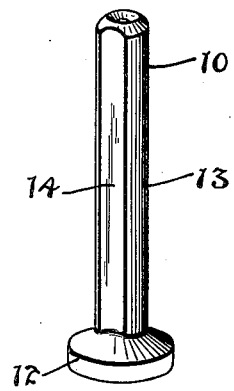
Figure 4 is a perspective view of the completed blank.
Figure 6:
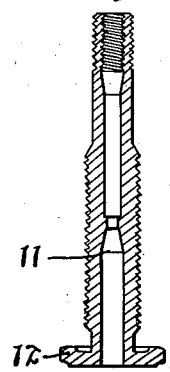
Figure 6 is a sectional detail of the machined valve body.

It has been the custom in the manufacture of bodies for tire valves to use rolled rod stock and to turn down the material to the required diameters and otherwise machine the metal to the required shape and sizes and to bore and ream the interior.

It is the purpose of this invention to greatly simplify the manufacture of such articles and in the carrying of this process into effect a cylindrical billet 1, preferably formed with an axial perforation 2 is first heated to a temperature which will enable the metals to flow freely upon the application of the pressure of a punch thereto.

The heated billet is inserted into the die 3 which is provided with a ring 4 having an upper surface 5 converging to a throat 6.

A punch 7 is inserted into the die 3 to engage the upper surface of the billet 1 and a small pilot punch 8 extending through the punch 7 projects beyond the inner end thereof and extends through the perforation 2 of the billet.

The end of the pilot punch 8 is tapered to a reduced end portion 9 which is of the diameter which it is desired to make the interior of the valve blank for a portion of its length.

The two punches are operated by suitable mechanisms to move inwardly into the die and when the main punch 7 engages the billet the inner reduced end 9 of the pilot punch 8 is disposed within the throat 6 of the die.

The continued movement of the punch 7 causes the metal of the billet to flow downwardly and the converging surface 5 directs the metal into the throat and it flows past the reduced end 9 of the pilot punch forming a tubular structure 10 with an outside diameter conforming to the internal diameter and shape of the ring 4 and an internal diameter corresponding with the end 9 of the pilot punch.

It will be readily understood that the downward movement of the punch 7 acting against the larger area of the billet will for a certain movement of the punch displace sufficient metal at the inward end of the billet to flow through the die to form a length of tubular material of much greater length than the length of movement of the punch, that is to say, a short movement of the punch produces a considerable length of extruded metal of a lesser diameter than that of the billet.

The progression of the inner or pilot punch is regulated in accordance with the required internal measurement of the blank and said inner punch moves inwardly until its larger diameter moves into the plane of the throat 6 and the area through which the metal extruded from the billet is thus reduced resulting in the interior dimension of the tubular product being drawn in a taper to a larger diameter 11.

The movement of the punches continues until the desired length of blank has been formed, a flange 12 being left at the inward end of substantially the same diameter required for the flange of the valve body.

The die ring 4 may be shaped with a circular forming throat, or it may be of any other desirable shape to produce an article with a special perimeter conformation.

In the instance illustrated, where a valve body blank is produced the die is formed with two parallelly flattened portions which thus form the main body portion 13 of the blank with the flat sides 14.

A blank thus produced is of very uniform texture and it is perforated from end to end which enables the insertion of reaming and other finishing tools without the necessity of previous boring and the diameters of the interior may be so arranged that the minimum of metal is required to be removed in the finishing operations, so also the exterior is produced of diameters which correspond closely to the finished diameter.

It will be readily appreciated by those skilled in the art of machining metal that the tools will require the very minimum of time for completing the finished surfaces. They will also have their actual cutting period reduced to the minimum so that not only is a great saving of time effected but the actual wear upon the tools is materially lessened.

It will be understood that the billets may be made up to any desired formulæ in accordance with the article to be produced and advantage may be taken of the use of scrap metal to a considerable extent, as it is all melted down and formed into billets instead of using expensive bar stock as is at present the practice.

The operation is extremely simple but is very fast as the dies are mounted in a stamping type of press where the action is quick.

The mechanism for operating the punches is not herein shown as it is not deemed necessary, nor is any particular device shown for removing the completed blanks from the die. Any desirable form of "knock out" mechanism may be utilized.

What I claim as my invention is:—

1. A method of making tubular metal blanks, consisting in first forming a billet, then placing the billet in a die formed with a constricted throat, then projecting a punch provided with a reduced inner end through said billet to advance the said reduced end thereof into the plane of the throat, then applying pressure to the billet extruding the metal through said throat around the reduced end of the punch to form a tube, then during the extruding movement moving the inner punch to bring its larger diameter into the plane of the throat to form a tube with a larger internal diameter, the inward end of the extruding punch being arrested prior to extruding the entire body of metal from the die and thereby forming a flange on the end of the tubular member.

2. A method of making tubular metal blanks, consisting in first forming a billet with an axial perforation therethrough, then heating the billet and inserting the billet in a die having an end converging to a throat, then projecting a pilot punch through the perforation of the billet until its inner end is in the plane of the throat of the die, then moving a punch inwardly against the billet to flow the metal thereof through the throat around said central punch, then moving the central punch further into the throat to effect a reduction of the cross sectional area of the metal flowing therethrough, and thereby forming a blank with a central passage of varying diameter, the extruding punch being arrested to retain a flange upon the end of the metal blank.

3. A method of making tubular metal blanks of successive stepped dimensions consisting in applying an extruding pressure to a quantity of metal to flow the same through a forming passage and successively altering the effective cross-sectional area of said forming passage to effect corresponding successive changes in the cross-sectional dimensions of the extruded blank.

4. A method of making tubular metal blanks of stepped internal dimensions consisting in applying an extruding pressure to a confined quantity of extrudable metal to extrude the same through a forming passage and advancing a punch of stepped cross-section through the forming passage to successively alter the dimensions of the latter, thereby producing corresponding successive changes in the internal dimensions of the extruded blank.

5. A method according to claim 4 in which said stepped punch is advanced to gradually alter the size of the forming passage during the extrusion, producing a gradual change in the internal dimensions of the extruded blank between the successive stepped portions thereof producing a connecting portion between the respective stepped portions having a tapered effect on the inner wall.

JOHN WYCLIFFE LEIGHTON.